United States Patent [19]

Baumgartner et al.

[11] Patent Number: 5,431,367
[45] Date of Patent: Jul. 11, 1995

[54] MULTILAYER INJECTION MOLDS HAVING IMPROVED SURFACE PROPERTIES

[75] Inventors: Charles E. Baumgartner, Niskayuna; Katherine D. Hamly, Clifton Park, both of N.Y.

[73] Assignee: General Electric Company, Pittsfield, Mass.

[21] Appl. No.: 936,464

[22] Filed: Aug. 28, 1992

[51] Int. Cl.⁶ .................. B29C 33/56; B28B 7/36; B22C 1/22

[52] U.S. Cl. .................. 249/114.1; 106/38.2; 106/38.22; 164/23; 164/33; 164/527; 249/115; 428/340; 428/364; 428/372; 428/402; 428/458; 428/473.5

[58] Field of Search ............... 428/457, 901, 372, 458, 428/402, 473.5; 156/272.2; 425/542; 249/115, 134, 111, 79, 80, 114.1, 135; 264/225, 328.1; 106/38.2, 38.22; 164/23, 516, 519, 33, 525, 527

[56] References Cited

U.S. PATENT DOCUMENTS

| 4,983,247 | 1/1991 | Kim | 156/272.2 |
| 5,176,839 | 1/1993 | Kim | 249/114.1 X |
| 5,260,014 | 11/1993 | Holton et al. | 264/134 |

*Primary Examiner*—Paul J. Thibodeau
*Assistant Examiner*—Stephen Sand

[57] ABSTRACT

Articles such as molds for thermoplastics, having an insulating layer preferably of resin deposited on the metal core materials, have a second layer of metal suspended in resin deposited on said insulating layer. The second layer may contain metal in platelet form as the inner mold surface, or may contain metal in fiber, whisker or irregular form with a further metal coating deposited thereon to provide resistance to abrasion. In the latter case, the adhesion of the further metal coating to the mold surface is higher than is the case if no metal-containing resin layer is present.

9 Claims, No Drawings

MULTILAYER INJECTION MOLDS HAVING IMPROVED SURFACE PROPERTIES

BACKGROUND OF THE INVENTION

1. Field of the Invention

This invention relates to the molding of thermoplastic materials, and more particularly to articles useful as molds for such materials.

2. Description of the Prior Art

Various types of molds have long been in use for preparing shaped articles from thermoplastic resins, in such operations as injection molding, blow molding, resin transfer molding, compression molding and casting. Molds for these purposes are typically manufactured from metal or a similar material having high thermal conductivity.

For most purposes, high thermal conductivity is desirable since it permits the resin in the mold to cool rapidly, shortening the molding cycle time. At times, however, cooling is so rapid that the resin freezes instantaneously at the mold surface upon introduction into the mold, forming a thin solid layer which, especially if it contains a filler, can create rough surfaces, voids and porosity.

There have recently been disclosed multilayer molds in which a metal core has an insulating layer bonded thereto, for the purpose of slowing the initial cooling of the resin during the molding operation. The insulating layer is fabricated of material having low thermal conductivity, thus slowing the cooling of the molded resin, and also having good resistance to high temperature degradation, permitting use in a mold maintained at high temperatures. Said layer is typically made of a resin such as polyimide, polyamideimide, polyethersulfone or polyetherketone, typically applied in uncured form (e.g., as a polyamic acid in the case of a polyimide or polyamideimide) and subsequently cured.

Resinous insulating layers have a major disadvantage, however: they are not mechanically strong and are easily abraded upon contact, for example, with filled thermoplastics. Thus, they do not have sufficient mechanical integrity to produce molded articles having surfaces of high quality.

A solution to this problem is disclosed, for example, in various applications such as commonly owned application Ser. No. 07/784,115, now abandoned. It consists of one or more skin layers of hard material, typically metal, bonded to the insulating layer. The skin layer may be deposited by such operations as electroless deposition, electrolytic deposition and combinations thereof.

Such deposition operations introduce their own problems into the mold fabricating process. It is well known, for example, that the adhesion of metal layers to resinous substrates is poor. This fact has dictated that the resin employed in the insulating layer be one which intrinsically has or can be modified to have relatively high adhesion to metal layers deposited thereon. One genus of resins having this property is the fluorinated polyimides, of the type prepared by the reaction of pyromellitic dianhydride with 2,2-bis[4-(4-aminophenoxy)phenyl]hexafluoropropane. Such polyimides are available from Ethyl Corporation under the trademark "EYMYD".

Fluorinated polyimides of this type may be subjected to various operations to improve their adhesion to metal. Methods for so improving adhesion are disclosed in other copending, commonly owned applications, notably Ser. Nos. 07/765,801, 07/874,448, now U.S. Pat. No. 5,290,597, 07/874,453, now U.S. Pat. No. 5,302,467, and 07/874,458, now U.S. Pat. No. 5,288,519. The major disadvantage in the employment of such resins and adhesion improving methods is that the resins are considerably more expensive than corresponding non-fluorinated polyimides and other resins of high thermal conductivity and stability at high temperatures, and the adhesion improving operation is an additional process step which may be burdensome and inconvenient.

A further problem is the difficulties involved in repairing a mold having a metal skin on a resin insulating layer. To repair even relatively minor damage such as one or more scratches which penetrate the metal skin, it is necessary to remove the mold from use and deposit a new metal layer thereon by further electroless or electrolytic deposition, often after removing at least the area of the old skin which surrounds the damage. Thus, the mold is out of service for a relatively long period, often several weeks.

SUMMARY OF THE INVENTION

The present invention is based on the discovery of a highly effective procedure for producing a metal surface on a layer of low thermal conductivity, typically a resin layer. This procedure may comprise one step or two steps, depending on whether the metal surface desired is merely metal-rich or is a "skin". Said metal surface has high adhesion to the underlying resin layer. In many instances, the metal surface is also relatively easy to repair without removal of the mold.

Accordingly, the invention is an article comprising:

a substrate having high thermal conductivity;

a first layer of temperature-resistant material having low thermal conductivity, deposited on said substrate; and a second layer deposited on said first layer, comprising a suspension of metal particles in a temperature-resistant material having low thermal conductivity.

DETAILED DESCRIPTION OF PREFERRED EMBODIMENTS OF THE INVENTION

The articles of this invention find their principal use in the molding of thermoplastics, as previously noted. However, they may also be used for other purposes. For example, they may be fabricated into enclosures which block the passage of electromagnetic and radio frequency waves, which may cause interference. They may also be employed as parts for engines operated under high temperature conditions. Because of their predominant use in the molding of thermoplastics, however, such articles will frequently be identified as "molds" hereinafter.

The substrates in the articles of this invention, which are the mold cores in the preferred molds, are fabricated of material having high thermal conductivity. They are typically metal, and any metal suitable for molds may be employed.

The first layer (in a mold, the insulating layer) deposited on the mold core is typically of a resin, i.e., a polymer, having low thermal conductivity and being resistant to high temperatures. The aforementioned polyimides, polyamideimides, polyethersulfones and polyetherketones are illustrative; polyimides and polyamideimides are often preferred. The polyimide may be a fluorinated polyimide of the type previously described, although the presence of fluorine is not necessary to maximize adhesion of deposited metal since excellent adhesion is provided by the method of this invention.

Said first layer may be deposited by any of numerous art-recognized methods such as roller coating or spraying. In the case of a mold, spraying is usually preferred because of its effectiveness to coat an irregular surface uniformly. Many resins, including polyimides and polyamideimides, are cured after deposition. The thickness of the first layer is not critical but is typically in the range of about 10–500 microns.

The key feature of the articles of the invention is a second, metal-containing layer deposited on said first or insulating layer. The continuous phase of the metal-containing layer is a temperature-resistant polymer having low thermal conductivity. Said polymer is most often identical to the one employed as the insulating layer.

Suspended in the temperature-resistant polymer of the second layer are metal particles. The identity of the metal is not critical so long as it is substantially resistant to oxidation under the conditions of use of the mold. Nickel is often preferred.

The shape of the metal particles is not critical. However, spherical particles are less effective than those of other shapes in improving adhesion of metal skins; therefore, non-spherical particles are strongly preferred. They may be, for example, in the form of platelets, fibers or whiskers. Typical metal particle sizes are in the range of about 1–20 microns. It is preferred that the bulk density of the metal particles be below about 2 g./cc. The thickness of the second metal layer is typically in the range of about 10–100 microns, with about 25–50 microns usually being preferred.

Two embodiments of the invention are worth particular mention. In the first embodiment, the second layer is the inner metal surface layer of the mold, which contacts the resin being molded. This embodiment is particularly useful when said resin is charged to the mold at relatively low pressure, as in blow molding and low pressure injection molding, whereby the mold surface encounters relatively low friction; and when the degree of smoothness of the surface of the molded part is not critical.

The metal constituent of the second layer is most often in platelet form in this embodiment, so as to produce a relatively dense, metal-rich surface wherein the platelets are substantially parallel to the surface of the mold. Nickel particles in platelet form are commercially available as, for example, "Novamet HCA-1" nickel filler, a product of Novamet Products Corp.

The bulk density of the metal in platelet form is preferably in the range of about 1.1–1.5 g./cc., and the particles thereof generally have an average width on the order of 10 microns and an average thickness in the range of about 0.1–0.5 micron. Said metal is typically suspended in the resin at weight ratios of metal to resin (excluding solvent) in the range of about 0.5–5.0:1.

Conventional application methods such as those described above with reference to the first layer may also be employed for the second layer, with spraying generally being preferred. When necessary, said layer is cured after application.

The metal surfaces provided by the first embodiment are particularly advantageous because of the ease of repairing scratches and other minor damage therein. All that is necessary is to apply further metal-resin suspension, typically by the same application method previously employed, and to burnish or polish the resulting surface after curing of the resin if curing is necessary. The repaired surface is then suitable for continued use.

In the second embodiment of the invention, a further metal coating is applied over said second layer. The metal suspended in the resin for formation of the second layer is usually in fiber, whisker or irregular form and has a somewhat lower bulk density than the platelet-form metal used in the first embodiment, typical bulk densities being in the range of about 0.4–1.0 g./cc. Filament lengths in the range of about 10–50 microns are typical Products of this type are illustrated by "Novamet 255", "Novamet 255AC" and "Novamet 287" nickel powders. The metal in the second layer itself is porous as contrasted with the dense metal surface provided in the first embodiment. Metal to resin ratios of about 1–4:1 are preferred, since optimum adhesion of said further coating is observed in this range.

One advantage of using irregular-shaped or fibrous metal particles is that the exposed surface particles in the second layer are catalytic toward electroless deposition of metals such as nickel. It may nevertheless be advantageous under some conditions to treat the surface of the second layer to further activate it catalytically. Typical treatments of this type may include abrasion to expose a maximum of metal particles and/or surfactant treatment to increase their hydrophilicity.

The deposition of the second layer in this embodiment may be effected by the methods described hereinabove with respect to the first embodiment. Similar ratios of metal to resin may be employed. Following its deposition, the further metal coating may be applied by such art-recognized methods as electroless or electrolytic deposition; electroless deposition is usually preferred for large mold surfaces, and electroplating for small surfaces.

Improved adhesion of the further metal coating is believed to be provided according to this embodiment by a combined mechanical and metallurgical interaction between said coating and the metal in the second layer. The second layer is also electrically conductive by reason of the metal therein, facilitating the electrodeposition of further metal thereon.

The invention is illustrated by the following examples. All parts and percentages are by weight unless otherwise indicated. Adhesion was measured by a test (IPC method 2.4.8) in which strips of tape, 3.2 mm. wide, are used to mask portions of a metallized surface after deposition of electrolytic copper and the exposed copper is etched away with concentrated nitric acid. The substrate is rinsed thoroughly in water, after which the tape is removed and the remaining copper strips subjected to a 90° peel test.

EXAMPLE 1

A stainless steel plaque was employed to emulate the surface of a mold. It was abraded by grit blasting, washed with water and dried. Its surface was then sprayed with a 6% solution of "EYMYD" polyimide precursor in a mixture of N-methylpyrrolidone and methyl ethyl ketone comprising 20% by volume N-methylpyrrolidone. The polyimide was dried briefly at 240° C. and the process was repeated a sufficient number of times to produce, after curing, a first resin layer 250 microns thick in which the resin was polyimide. The coated plaque was then heated for 2 hours at 240° C. and 2 hours at 315° C. to form the fully cured polyimide.

The first resin layer was spray-coated to a thickness of 38 microns with a suspension in the same EYMYD solution of 12% powdered nickel (NOVAMET Ni-255), having an irregular particle shape and a bulk density of about 0.5 g./cc. The polyimide in the suspension was cured under the same conditions employed in the previous curing step, to form a second layer.

The surface coated with the second layer was blasted with glass beads to expose nickel particles, and the residue was removed by spray rinsing with water. The plaque was then immersed in a commercial electroless nickel plating solution (Enthone ENPLATE 426) and plated for 30 minutes, after which it was water rinsed and dried at 110° C. for 16 hours. Finally, a 38-micron layer of copper was electroplated on the electroless nickel. It had a peel strength of 66.2 g./mm.

EXAMPLE 2

The procedure of Example 1 was repeated four times, with the addition of 10-minute treatments with four different surfactant solutions following glass bead blasting and rinsing, followed by a 10-minute water rinse. The peel strengths of the resulting plaques varied from 119.9 to 193.3 g./mm., demonstrating the advantage of surfactant treatment prior to electroless deposition.

EXAMPLE 3

The procedure of Example 2 was repeated, with the addition of the following steps of treatment with a catalyst for electroless deposition after the surfactant treatment and water rinse:
Shipley CATAPREP 404—1 minute;
Shipley CATAPOSIT 44—5 minutes;
Water rinse—4 minutes;
Shipley Accelerator 19—5 minutes;
Water rinse—5 minutes.

The peel strength for the resulting plaque was 252.4 g./mm., demonstrating the advantage of treatment with catalyst. EXAMPLES 4–8

The procedure of Example 1 was repeated, substituting for the "EYMYD" polyimide a polyamideimide precursor sold by DuPont under the tradename "TORLON", comprising structural units of the type resulting from the reaction of trimellitic anhydride with an aromatic diamine. The polyamideimide coating was cured for 2 hours at 288° C. after application. The second layer contained various nickel powders from Novamet Products Corp. suspended in the polyamideimide precursor solution at a weight ratio of nickel to resin of 2:1. The peel test results are given in Table I.

TABLE I

|  | Example | | | | |
|---|---|---|---|---|---|
|  | 4 | 5 | 6 | 7 | 8 |
| Ni powder: | | | | | |
| Product designation | Ni-255 | Ni-255AC | Ni-287 | HCA-1 | Ni-123 |
| Particle shape | Irreg. | Irreg. | Irreg. | Platelets | Spheres |
| Bulk density, g./cc. | 0.5 | 0.6 | 0.9 | 1.2 | 2.2 |
| Peel strength, g./mm. | 161.1 | 150.4 | 80.6 | 26.9 | 12.5 |

It is apparent that adhesion is improved to a substantially greater extent when the metal particles are non-spherical than when they are spherical, and also that the particles with irregular shapes and bulk densities in the range of about 0.4–1.0 g./cc. produced substantially better adhesion than the platelet-shaped or spherical particles having higher bulk densities.

EXAMPLE 9

The procedure of Example 4 was repeated, varying the metal to resin ratio in the second layer. The results are given in Table II.

TABLE II

| Ratio. metal/resin | Peel strength. g./mm. |
|---|---|
| 1:2 | 39.4 |
| 1:1 | 60.9 |
| 2:1 | 159.3 |
| 4:1 | 84:1 |
| 8:1 | 25:1 |

The results in Table II show that superior adhesion is demonstrated when the ratio of metal to resin is in the range of about 1:1–4:1, and drops off significantly at ratios above 5:1.

EXAMPLE 10

The procedure of Example 7, employing the HCA-1 nickel powder in platelet form, was repeated except that the article coated was an injection molding insert and no electroless metal was deposited, the second layer being a 25–50 micron resin coating rich in nickel in platelet form at the resin-contacting surface of the mold. The insert was used in an injection molding trial in which 50 samples of glass-filled bisphenol A polycarbonate resin were molded against the insert at an injection pressure of about 34.5 MPa. No evidence of abrasion of the mold surface was noted when the procedure was completed.

The injection pressure was then increased to 69 MPa. and 100 more samples were molded, again, the insert was inspected for wear and none was seen. Finally, the pressure was increased to 138 MPa. and an additional 100 samples were molded. The insert showed slight abrasion in the gate region but none elsewhere.

Similar tests were conducted at metal to resin ratios of 0.5–8.0:1. The best results were obtained at a ratio of 4:1.

Results similar to those described above were obtained with the following commercially available polyimides: "MATRIMID 5218" of Ciba-Geigy, based on 5-amino-1-(4'-aminophenyl)-1,3-trimethylindane; "P84" from Lenzing USA Corp., prepared from an aromatic diamine and bis-3,4-dicarboxybenzophenone dianhydride; and "AVIMID-N" from DuPont, based on an aromatic diamine and 2,2-bis(3,4-dicarboxyphenyl)hexafluoropropane dianhydride.

What is claimed is:

1. A multilayer mold for injection molding thermoplastic into finished parts, comprising:
a metal core;
a first layer of a polyimide, polyamideimide, polyethersulfone or polyetherketone polymer deposited on said core; and
a metal-containing second layer comprising non-spherical metal particles having a bulk density below 2 g./cc., dispersed throughout a polyamide, polyamideimide, polyethersulfone or polyetherketone resin deposited on said first layer, wherein the weight ratio of metal particles to resin is in the range of about 1–5:1.

2. A mold according to claim 1 wherein the thickness of the first layer is in the range of about 10–500 microns.

3. A mold according to claim 1 wherein the thickness of the second layer is in the range of about 10–100 microns.

4. A mold according to claim 1 further including a metal coating deposited on said second layer.

5. A mold according to claim 1 wherein the polymer is a polyimide or polyamideimide.

6. A mold according to claim 1 wherein the metal particles are nickel.

7. A mold according to claim 1 wherein the metal particles are in platelet form and have a bulk density in the range of about 1.1–1.5 g./cc.

8. A mold according to claim 1 wherein the metal particles in the metal-containing layer are in fiber, whisker or irregular form and have a bulk density in the range of about 0.4–1.0 g./cc, 9. A mold according to claim 8 wherein the weight ratio of metal particles to resin in the metal-containing layer is in the range of about 1–4:1.

* * * * *